US011425900B2

(12) United States Patent
Keshavjee et al.

(10) Patent No.: US 11,425,900 B2
(45) Date of Patent: Aug. 30, 2022

(54) MODIFIED DONOR ORGANS

(71) Applicants: Shaf Keshavjee, Toronto (CA);
Marcelo Cypel, Toronto (CA)

(72) Inventors: Shaf Keshavjee, Toronto (CA);
Marcelo Cypel, Toronto (CA)

( * ) Notice: Subject to any disclaimer, the term of this patent is extended or adjusted under 35 U.S.C. 154(b) by 0 days.

(21) Appl. No.: 14/658,456

(22) Filed: Mar. 16, 2015

(65) Prior Publication Data

US 2015/0208643 A1 Jul. 30, 2015

Related U.S. Application Data

(63) Continuation of application No. 13/447,025, filed on Apr. 13, 2012, now abandoned.

(60) Provisional application No. 61/499,983, filed on Jun. 22, 2011.

(51) Int. Cl.
*A01N 1/02* (2006.01)

(52) U.S. Cl.
CPC ........... *A01N 1/021* (2013.01); *A01N 1/0215* (2013.01); *A01N 1/0226* (2013.01); *A01N 1/0247* (2013.01)

(58) Field of Classification Search
None
See application file for complete search history.

(56) References Cited

U.S. PATENT DOCUMENTS

| | | | |
|---|---|---|---|
| 5,599,659 A | 2/1997 | Brasile | |
| 5,699,793 A | 12/1997 | Brasile | |
| 5,843,024 A | 12/1998 | Brasile | |
| 6,024,698 A | 2/2000 | Brasile | |
| 6,328,960 B1 * | 12/2001 | McIntosh | A61K 35/28 424/529 |
| 6,375,613 B1 | 4/2002 | Brasile | |
| 6,582,953 B2 | 6/2003 | Brasile | |
| 6,642,045 B1 | 11/2003 | Brasile | |
| 7,255,983 B2 | 8/2007 | Steen | |
| 2008/0017194 A1 * | 1/2008 | Hassanein | A01N 1/02 128/200.24 |
| 2013/0323763 A1 | 12/2013 | Kakugawa et al. | |

FOREIGN PATENT DOCUMENTS

CA 2427765 5/2002

OTHER PUBLICATIONS

Cypel et al., J. Heart Lung Transplant. 27: 1319-1325 (2008).*
Cypel et al., J. Heart Lung Transplant. 28: 753-758 (2009).*
Läkemedelsverket, "Public Assessment Report: Perfadex", https://docetp.mpa.se/LMF/Perfadex%20solution%20for%20organ%20preservation%20ENG%20PAR.pdf, Jan. 21, 2010 (accessed May 16, 2017).*
Foronjy et al., Cells 1: 874-885 (2012).*
XVIVO Perfusion, https://www.xvivoperfusion.com/wp-content/uploads/2018/01/PRODUCT-SHEET_STEEN-SOLUTION.pdf, accessed Jul. 19, 2019.*
Manning et al., Human Gene Therapy 21: 713-727 (Jun. 2010).*

(Continued)

*Primary Examiner* — Erin M. Bowers

(57) ABSTRACT

A repaired ex vivo organ suitable for transplantation in a human, said repaired ex vivo organ having undergone ex vivo organ perfusion for a maintenance period, wherein said organ had been assessed as being unsuitable for transplantation into a human before the maintenance period and was determined to be suitable for transplantation after the maintenance period.

10 Claims, 6 Drawing Sheets

(56) References Cited

OTHER PUBLICATIONS

Lee et al., Proc. Nat'l. Acad. Sci. USA 106(38): 16357-16362 (2009).*
Cypel et al., Science Translational Medicine 1(4): 4ra9 (2009).*
Cypel, M. et al. One Year Survival and Functional Status of Patients from the Human Ex Vivo Lung Perfusion. The Journal of Heart and Lung Transplantation. vol. 30. No. 4S. Apr. 2011. pp. S37.
Yeung, J. et al. Ex vivo lung perfusion and reconditioning. Multimedia Manual of Cardiothoracic Surgery. 2011. pp. 1-6.
Cypel, M. et al. Functional Repair of Human Donor Lungs by IL-10 Gene Therapy. Sci Transl Med 1. 4ra9. 2009. pp. 1-9.
Cypel, M. et al. Normothermic Ex Vivo Lung Perfusion Prevents Lung Injury Compared to Extended Cold Preservation for Transplantation. American Journal of Transplantation. 2009. vol. 9. pp. 1-8.
Cypel, M. et al. Normothermic Ex Vivo Lung Perfusion in Clinical Lung Transplantation. The New England Journal of Medicine. 364:15. Apr. 14, 2011. pp. 1431-1440.
Cypel, M. et al. Technique for Prolonged Normothermic Ex Vivo Lung Perfusion. The Journal of Heart and Lung Transplantation. Dec. 2008. vol. 27. No. 12. pp. 1319-1325.
Cypel et al; "Initial Experience With Lung Donation After Cardiocirculatory Death in Canada"; 2009; The International Society for Heart and Lung Transplantation. 1053-2498/09/S-See Front Matter; DOI:10/1016/J.HEALUN.2009.05.009.
Yeung, Jonathan C. et al., "Towards Donor Lung Recovery—Gene Expression Changes During Ex Vivo Lung Perfusion of Human Lungs", Am J Transplant; 2018; 18:1518-1526.
Daisuke Nakajima et al., "Mesenchymal stromal cell therapy during ex vivo lung perfusion ameliorates ischemia-reperfusion injury in lung transplantation", The Journal of Heart and Lung Transplantation, vol. 38, No. 11, Nov. 2019, pp. 1214-1223.
Pierre Mordant et al., "Mesenchymal stem cell treatment is associated with decreased perfusate concentration of interleukin-8 during ex vivo perfusion of donor lungs after 18-hour preservation", The Journal of Heart and Lung Transplantation, 2016, pp. 1-10.
Kang et al. "Transcriptional Signatures in donor lungs from donation after cardiac death vs after brain death: A functional pathway analysis", The Journal of Heart and Lung Transplantation, pp. 289-298; vol. 30, No. 3, Mar. 2011.

* cited by examiner

MODIFIED DONOR ORGANS

RELATED APPLICATIONS

This application claims priority from U.S. Provisional Application No. 61/499,983, filed Jun. 22, 2011, the contents of which are incorporated herein by reference.

FIELD OF INVENTION

This invention relates to systems, processes, and methods for ex vivo organ preservation, maintenance, repair, and/or assessment. This invention also relates to preserved, maintained, repaired and/or assessed organs provided by the systems, processes and methods described herein.

BACKGROUND

Organ transplantation is lifesaving for patients. For example, lung transplants can be lifesaving for individuals with end-stage lung diseases; however, the number of patients waiting for lung transplants greatly exceeds the number of available donors. On average, 15% of lungs from multi-organ donors are used for transplantation and the rest are typically considered unsuitable.

Currently, the use of static hypothermia is widely accepted for preserving organs after removal. There are drawbacks to this method, however, such as drawbacks related to keeping an organ in a hypothermic state for a period of time. For example, the inhibition of cellular metabolism as a result of hypothermia can make it difficult to repair an organ or assess its suitability or condition during the preservation period.

In addition, many organs are considered injured or too "high risk" to be transplanted in a human. For example, more than 80% of donor lungs are considered too high risk for reasons including lung injury that typically occurs after brain death and/or complications associated with treatment in intensive care units.

Although non-optimal donor organs, such as lungs with suboptimal gas-exchange function or infiltrates visible on chest radiographs, have been used with success, increased primary graft dysfunction (an acute lung injury typically occurring within 72 hours after transplantation) has been reported in some studies. These injuries can affect early outcomes and can be associated with an increased risk of chronic graft dysfunction.

The techniques currently used to assess an organ for transplant suitability cannot adequately identify every suitable organ because of hypothermic preservation conditions and time constraints. As a result, clinicians tend to be highly conservative when selecting donors, and because of the relatively small number of organs that are deemed to be acceptable, mortality in patients awaiting transplantation is high. Furthermore, current preservation and maintenance procedures do not allow for the possibility of repairing and/or improving a suitable or high risk organ.

Having an increased number of suitable organs, such as lungs, available to transplant is a promising means of augmenting the number of organ transplants and thereby saving more lives. Accordingly, there is a desire for a system that will adequately preserve and maintain an organ for a period of time and in such a condition that it can be assessed, repaired, and/or improved in order to give the transplant recipient the best chance for recovery.

SUMMARY OF INVENTION

An aspect of the present invention is a repaired ex vivo organ suitable for transplantation in a human, said repaired ex vivo organ having undergone ex vivo organ perfusion for a maintenance period, wherein said organ had been assessed as being unsuitable for transplantation into a human before the maintenance period and was determined to be suitable for transplantation after the maintenance period. The repaired ex vivo organ can be a lung having a best ratio of the partial pressure of arterial oxygen to the fraction of inspired oxygen of more than 350 mm Hg. In some embodiments, the lung may have been assessed as being unsuitable for transplantation because its best ratio of the partial pressure of arterial oxygen to the fraction of inspired oxygen was less than 300 mm Hg. The maintenance period of time can be at least 24 hours, 8 hours, 3 hours, or 1 hour.

In some embodiments, the repaired ex vivo organ can also undergone ex vivo perfusion for a treatment period. According to some embodiments, the repaired ex vivo organ is a lung and may have been assessed as being unsuitable for transplantation because it had pulmonary edema, pneumonia, or inflammation. In embodiments where the organ is a lung and was assessed as having injury or pulmonary edema, it may have been subjected to antibiotics, hyper-perfusion techniques, beta-agonists, anti-inflammatory agents, or flow techniques during the treatment period. In embodiments where the lung was assessed as having pneumonia, it may have been subjected to antibiotics or steroids during the treatment period. In embodiments where the lung was assessed as having inflammation, it may have been subjected to gene therapy, stem cells, or anti-coagulants during the treatment period. In some embodiments, the repaired ex vivo organ can be a lung, liver, heart, kidney, or pancreas.

Another aspect of the invention is a donor organ system for repairing and/or improving a donor organ so that the donor organ is suitable for transplantation into a human. The donor organ system comprises the steps of (i) determining the status of the organ by evaluating pre-selected criteria; (ii) subjecting the organ to an acellular perfusate at normothermic temperatures for a maintenance period; and (iii) determining improvement and/or repair of the organ by re-evaluating the pre-selected criteria. In some embodiments, the maintenance period can within the range of 1 to 10 hours, 1 to 7 hours, or 1 to 3 hours. In some embodiments, step (i) can be performed concurrently with step (ii). In some embodiments, the organ can be a lung, liver, heart, kidney, or pancreas.

The donor organ system of the present invention can further comprise the step of treating the organ with a suitable medical treatment for a treatment period after step (ii). In some embodiments, the treatment period is within the range of 1 to 10 hours, 1 to 7 hours, or 1 to 3 hours.

Another aspect of the invention is a method of improving an ex vivo organ, the method comprising the steps of (i) determining the status of the organ by evaluating pre-selected criteria; (ii) subjecting the organ to an acellular perfusate at normothermic temperatures for a maintenance period; and (iii) determining improvement of the organ by re-evaluating the pre-selected criteria. In some embodiments of the invention, the organ can be a lung, liver, heart, kidney, or pancreas. In an embodiment where the organ is a lung, the pre-selected criteria can include the ratio of partial pressure of arterial oxygen to the fraction of inspired oxygen. In some embodiments the pre-selected criteria can show an improvement of at least 10%, at least 20%, or at least 40% between steps (i) and (iii).

BRIEF DESCRIPTION OF DRAWINGS

For a better understanding of embodiments of the organs, processes, systems, and methods described herein, and to show more clearly how they may be carried into effect, reference will be made by way of example to the accompanying drawings in which.

DESCRIPTION OF INVENTION

Figure 1:
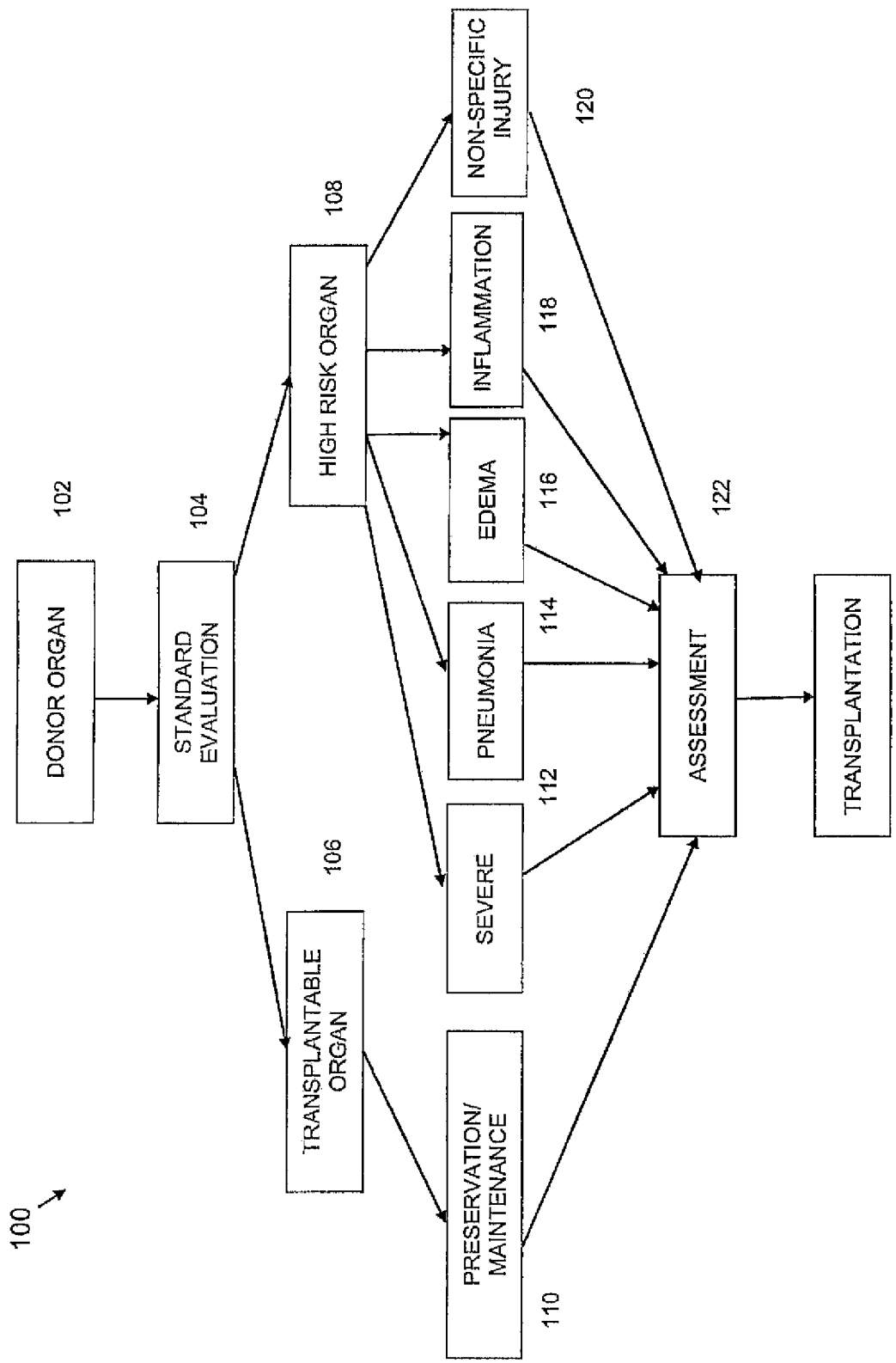
FIG. 1 is a representation of the donor organ systematic process according to an embodiment of the present invention.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing the implementation of the various embodiments described herein.

The present invention generally provides a systematic process for preserving, maintaining, repairing, and/or improving an organ isolated from a donor. The process also provides a method for assessing the organ to determine whether it is suitable for transplantation into a human. Organs subjected to this process can be improved candidates for transplantation compared to organs subjected to current transplantation protocols.

The improved process of providing an organ suitable for transplantation into a human is set out in FIG. 1 as process 100. Process 100 begins with donor organ 102. Donor organ 102 has been isolated from the donor by suitable procedures and is considered to be an ex vivo organ. Organs suitable for the present invention include any organ suitable for transplantation, including one or both lungs, liver, heart, kidney, pancreas, or a composite tissue, such as a face or hand. One or both lungs are preferred. Once donor organ 102 has been isolated from the donor, it can be subjected to standard evaluation 104. Standard evaluation 104 methods include methods traditionally used by the skilled person to assess whether an organ is suitable for transplantation. For example, clinicians often assess suitability based on factors such as the rate of change of the ratio of partial pressure of arterial oxygen to the fraction of inspired oxygen ($PO_2$ or $PaO_2/FIO_2$), pulmonary vascular resistance, peak inspiratory pressure, or dynamic compliance, bronchoscope findings, radiologic assessment, and direct examination of the lung during procurement. In addition, lungs that are obtained from donors without a heartbeat are often not considered suitable for transplantation as their function is more unpredictable.

If donor organ 102 is deemed to be an injured organ 108 by standard evaluation 104, it will be categorized according to treatment protocols. An injured organ is one that is deemed sub-optimal or too high risk to be successfully transplanted into a human. For example, an injured organ may have be indicated as such because of the presence of pneumonia, edema, or inflammation. Also, the injured organ may have an injury such as a disruption of the blood-alveolar barrier, a severe injury, such as a mechanical injury, or an injury that is difficult to determine, such as a non-specific injury. In addition, or in other cases, the injured organ may have sub-optimal physiologic criteria, such as sub-optimal $PaO_2/FIO_2$, pulmonary vascular resistance, peak inspiratory pressure, or dynamic compliance. Categorization of injured organ 108 can occur as part of standard evaluation 104, or as a separate step once donor organ 102 has been determined to be an injured organ 108. Categories of injury of injured organ 108 include, but are not limited to, severe injury 112, pneumonia 114, edema 116, inflammation 118, and non-specific injury 120. Generally, any organ that is considered "high risk" for transplantation into a human can fall under a category of injury.

Each injured organ 108 can be treated, with the intent to repair, according to the category of injury it falls. It will be recognized by the skilled person that injured organ 108 may fall under more than one category and may therefore benefit from a mixture of treatments. Ideally, every injured organ 108 can undergo ex vivo organ perfusion (sometimes referred to as "EVOP") before or concurrently with treatment. An ex vivo perfusion system is described further below.

Treatment of injured organ 108 can involve any suitable treatment. For example, if injured organ 108 falls under category severe injury 112, it can be treated with suitable stem cells or a de-cellularization and re-cellularization regimen, or mixtures thereof, according to methods known to those with skill in the art. If injured organ 108 falls under category pneumonia 114, it can be treated with antibiotics, steroids, alveolar lavage, or mixtures thereof, according to methods known to those with skill in the art. If injured organ 108 falls under category edema 116, it can be treated with antibiotics, hyperperfusion techniques, hyper-osmotic agents, beta-agonists, or flow techniques, where, for example, optimal perfusion flow is about 40% of estimated cardiac output of the donor, or mixtures thereof, according to methods known to those with skill in the art. If injured organ 108 falls under category inflammation 118, it can be treated with anti-inflammatory agent, gene therapy, stem cell therapy, anti-coagulation therapy, or mixtures thereof, according to methods known to those with skill in the art. If injured organ 108 falls under category non-specific injury 120, it can be evaluated by techniques known to the skilled person to determine the best treatment options.

Transplantable organs 106 can also benefit from being subjected to an EVOP system (described below). Such a system can preserve and maintain transplantable organs 106 in order to ensure that they are in optimum condition for transplantation into a recipient. The EVOP system can also improve transplantable organs 106 to make them even better candidates for transplantation.

Ex Vivo Organ Perfusion ("EVOP") System

An ex vivo organ perfusion system of the present invention subjects a donor organ to a blood-less acellular normothermic perfusate. With this system, donor organ 102 can be perfused in an ex vivo circuit, providing an opportunity to assess and re-assess the function of donor organ 102 before transplantation. The EVOP can be used at all stages of process 100 to assist in the preservation, maintenance, repair, improvement, and/or assessment of an organ. For example, EVOP can be used soon after donor organ 102 has been excised from the donor, and can replace or supplement standard evaluation 104 of process 100. EVOP can also be used after standard evaluation 104 on both transplantable organ 106 and injured organ 108 in order to preserve, maintain, improve, assess and, in the case of injured organ 108, repair donor organs 102. With ex vivo organ perfused organs, organs are perfused, and in the case of lungs, are additionally ventilated, at body temperature to mimic physiologic conditions, which can preserve and maintain the organ, as well as allow the organ to be treated or to repair itself. Successful EVOP can restore the cell structure integrity and allow, for example, ZO-1 tight junction repair of donor organ 102. Organs subjected to EVOP can be preserved and maintained for 12, 24, 72 hours, or longer.

Figure 2:
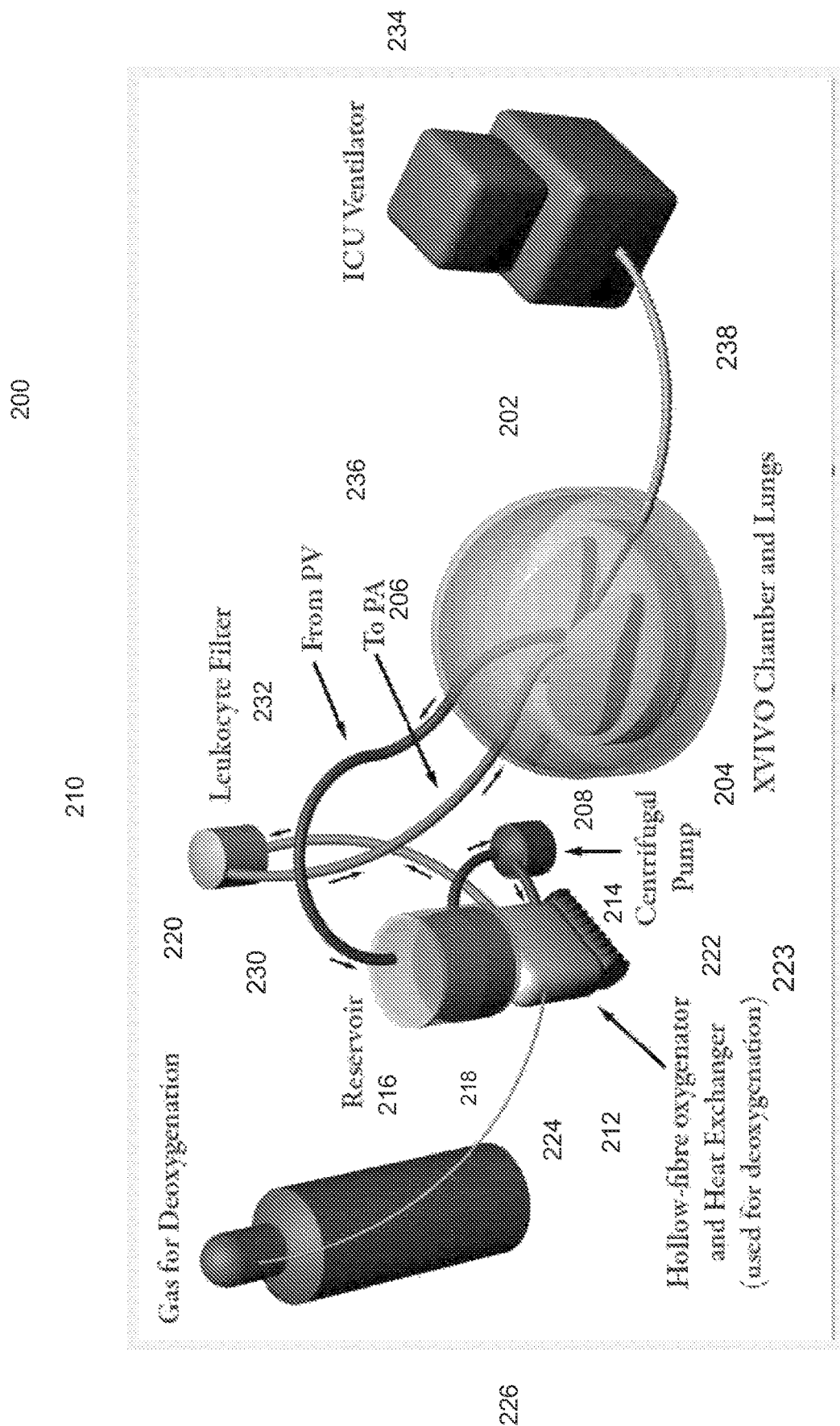
FIG. 2 is a schematic drawing of the ex vivo organ perfusion system according to an embodiment of the present invention.
Figure 3A:
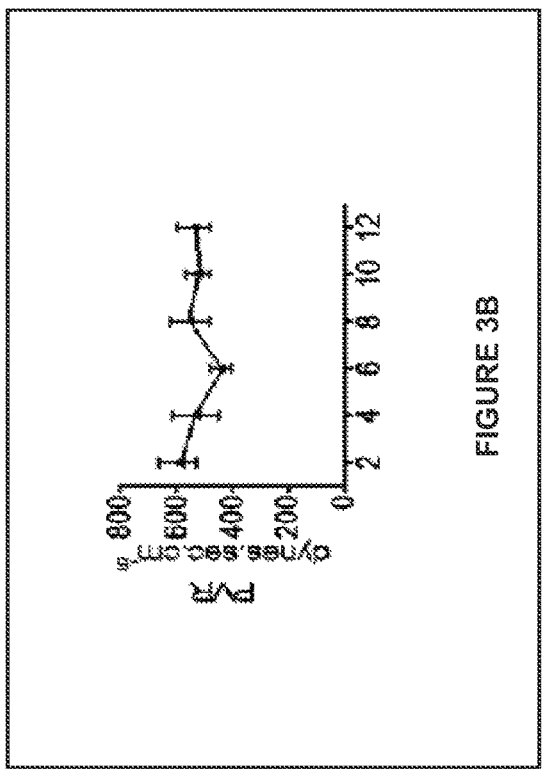
FIGS. 3A, 3B, 3C, and 3D are graphs showing ex vivo lung function according to an embodiment of the present invention.
Figure 3B:
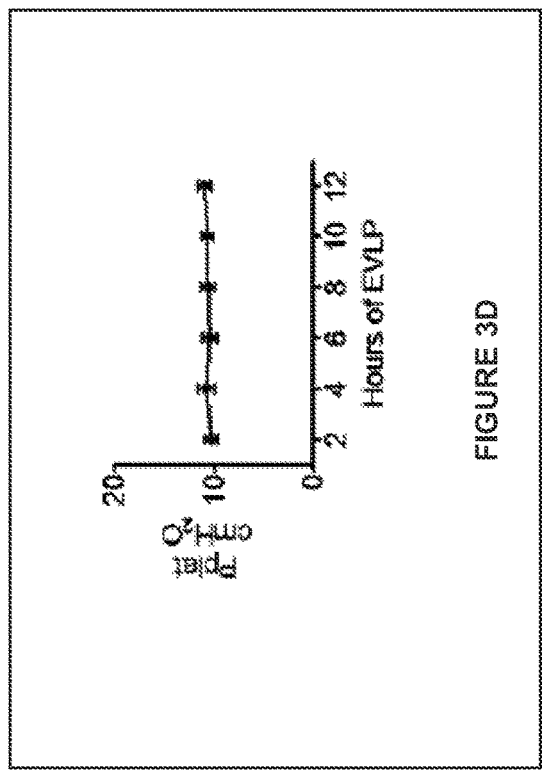
Figure 3C:
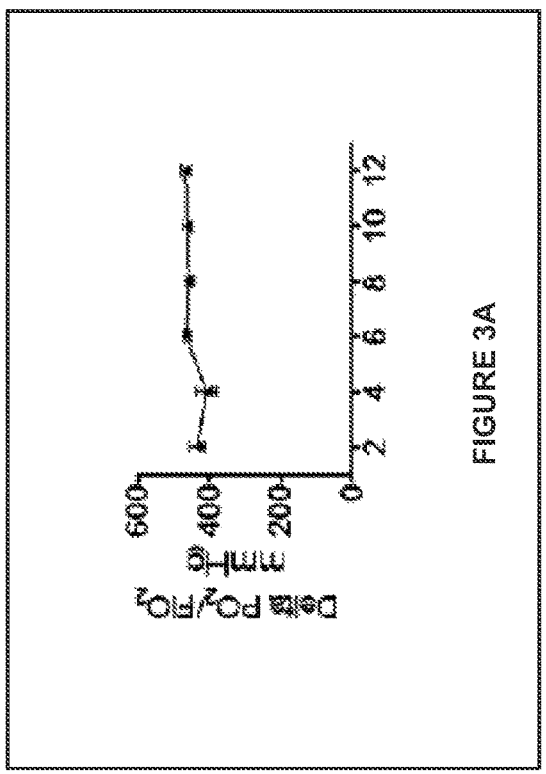
Figure 3D:
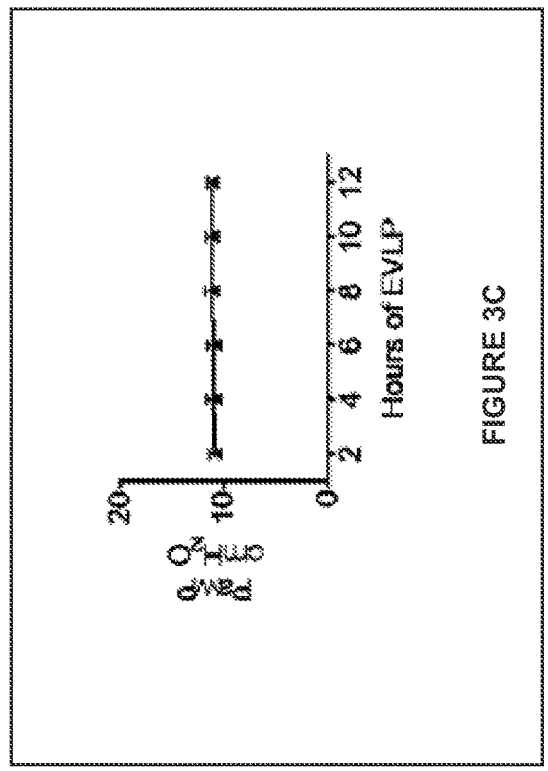

With reference to FIG. 2, an embodiment of an ex vivo organ perfusion system 200 is shown, where the organs in question are lungs. However, skilled persons will appreciate that other organs can be perfused using the ex vivo organ perfusion system 200, such as those mentioned above. In the embodiment shown, the ex vivo organ perfusion system 200 is a closed loop system. Also in the embodiment shown, donor organ 102 is represented by donor lungs 202.

EVOP system 200 requires perfusate 218, which may comprise or consist of a commercially available solution, such as Steen Solution™, Perfadex™ solution or other solution suitable for perfusion according to the present invention. Steen Solution™ comprises calcium chloride, Dextran 40, Glucose, Human serum albumin, magnesium chloride, potassium chloride, sodium bicarbonate, sodium chloride, sodium dihydrogen phosphate, and water. It is preferable that the solution has a pH of about 7.4 (±0.3) and an osmolality of around 295±20 mOsm/kg. It will be recognized by the skilled person that solutions that do not comprise all of these ingredients, substitute ingredients, or have additional ingredients, may be suitable to use as perfusate 218. Other components can be used in perfusate 218 to either assist in the preservation, maintenance, improvement, or repair of donor organ 102. For example, heparin or the like can be used, such as, for example, sodium heparin, in an amount of, for example, 3,000 to 10,000 international units. Antibiotics can be added, such as, for example, cefazolin or Primaxin™, in an amount of, for example, 500 mg. Another example of a component that can be added to perfusate 218 are steroids, such as methylprednisolone (also known as Solumedrol™), in an amount of, for example, and 500 mg. It is preferred that perfusate 218 is acellular; that is, it does not contain or contains a minimal amount of red blood cells, particularly when donor organ 102 is one or two lungs.

The ex vivo organ perfusion system 200 of the current embodiment is designed to provide perfusate 218 to donor organ 102 in a beneficial and temperature-controlled manner. Referring now to FIG. 2, perfusate 218 is collected and/or stored in reservoir 216, which may have a soft or hard shell and can made of any suitable material, such as a laboratory or medical grade plastic. Reservoir 216 is connected to outlet hose 220, which in turn is connected to pump 214. Pump 214 can be a centrifugal pump, or any other pump suitable for facilitating the circulation of perfusate 218 through system 200. Pump 214 is connected to membrane gas exchanger 212 by hose 222. Membrane gas exchanger 212 can be, as in the embodiment shown, a hollow-fibre oxygenator and heat exchanger. Membrane gas exchanger 212 is also connected to deoxygenator gas tank 226 via gas line 224. Tank 226 houses gas that is suitable to substantially deoxygenate perfusate 218 while it passes through membrane gas exchanger 212 to decrease the $pO_2$ to a range of about 30 mm Hg to about 80 mm Hg. The gas supplied by tank 226 is typically a gas mixture comprising about 6% oxygen ($O_2$), about 8% carbon dioxide ($CO_2$), and about 86% nitrogen ($N_2$). The skilled person would understand that other gases or gas mixtures may achieve the result of substantial deoxygenation of perfusate 218 according to the present invention. Membrane gas exchanger 212 is also connected to heat exchanger 228, which maintains perfusate 218 at a desired temperature, such as at a temperature between about 20 degree Celsius and 38 degree Celsius. Most preferably, the temperature is about 37 degree Celsius.

Membrane gas exchanger 212 is also connected to leukocyte filter 210 by hose 230. During operation of system 200, perfusate 218 passes from membrane gas exchanger 212 to leukocyte filter 210 through hose 230. Leukocyte filter 210 reduces the amount of leukocytes located in perfusate 218 as it passes through leukocyte filter 210 by an amount in the range of 70% to about 100%. Leukocyte filter 210 is connected to cannula 208 in a manner that allows perfusate 218 to enter donor lungs 202 as described herein. Donor lungs 202 comprise pulmonary artery 204 and left atrium 206. Donor lungs 202 are transported from the donor (not shown) in a suitable manner and would typically be available for perfusion anywhere between immediately and to about 24 hours after being removed from the donor, more preferably within 12 hours. In the embodiment shown, pulmonary artery 204 is attached to pulmonary artery cannula 208 in a manner that allows perfusate 218 to flow through cannula 208 and into pulmonary artery 204 without unacceptable leakage. An exemplified manner of attachment is described further below.

Pulmonary artery flow of perfusate 218 is controlled by centrifugal pump 208 and measured using a flow meter (not shown), which in some embodiments can be an electromagnetic flow meter. The outflow of perfusate returns through left atrial cannula 232 to reservoir 216. Pulmonary artery and left atrial catheters 208 and 232 placed in situ continuously measure the pressures of the pulmonary artery and the left atrium of lungs 202. In the embodiment shown, lungs 202 are ventilated with ventilator 234, which, in the embodiment shown is an ICU-type ventilator.

In order to operate system 200, the steps taken generally include priming the close-looped system shown in FIG. 2, preparing the organs, initiating EVOP, maintaining a steady-state phase of EVOP, assessing the organs, and terminating EVOP.

To prime the circuit, system 200 is primed with a suitable amount of perfusate 218. The system can be primed with, for example, 1 to 2 liters of perfusate 218. The amount required can be determined by the skilled person. In some embodiments, ex vivo organ perfusion system 200 can be primed with about 1 or 2 liters of perfusate.

Generally, prior to perfusion of donor organ 102, donor organ 102 is prepared for ex vivo organ perfusion system 200. By way of example, the preparation of donor lung 202 is described for use with system 200; however, skilled persons will understand that other organs can be prepared and perfused with ex vivo organ perfusion system 200.

After donor lung 202 is retrieved from the donor, the heart is excised from the heart-lung block. The left atrial appendage is trimmed off and left atrial cannula 232 is sewn to the left atrial cuff of left atrium 206. In some embodiments, left atrial cannula 232 can be funnel-shaped with a built-in pressure monitor. By inserting and sewing left atrial cannula 232 to left atrium 206, a consistent outflow drainage of perfusate 218 can be provided during perfusion using system 200. This can create a positive left atrial pressure within a range of about 3 mmHg to about 5 mmHg. Pulmonary artery cannula 208 is substantially similar to left atrial cannula 232 and is inserted into and sewn to the pulmonary artery 204. In some embodiments, left atrial and pulmonary artery cannulas 232 and 208 can be trimmed to fit left atrium 206 and pulmonary artery 204.

After cannulas 208 and 232 have been inserted into and sewn to the pulmonary artery 204 and left atrium 206, a back-table retrograde flush is performed, in some embodiments using about 500 ml of Perfadex™ under gravity drainage at 30 cm. During this procedure, any potential perfusate leaks from the pulmonary artery or left atrial cannulas 208 and 232 can be checked and secured if required.

During operation of system 200, donor organ 102 can be housed in ex vivo chamber 236, such as a commercially available brand, (e.g., XVIVO), which has suitable openings for necessary equipment, such as pulmonary artery cannula 208, left atrial cannula 232, and ventilator hose 238. Chamber 236 can assist in maintaining donor organ 102 contaminant-free and temperature regulated. Before transferring lungs 202 to chamber 236 of system 200, the trachea (not shown) of lungs 202 is opened and bronchial cleaning of secretions is performed. Further, an endotracheal tube, in some embodiments having an inner diameter of about 9 mm is inserted in the trachea and secured circumferentially, in some embodiments using umbilical tape.

In some embodiments, during operation of system 200, a slow retrograde flow is optionally initiated to de-air pulmonary artery cannula 208. Once de-airing is complete, pulmonary artery cannula 208 can be connected to ex vivo organ perfusion system 200 and anterograde flow is initiated, in some embodiments at a flow rate of about 150 mL/min. During this time, perfusate 218 can be at room temperature.

In order to initiate system 200, the temperature of perfusate 218 can be incrementally increased to body temperature, for example 37 degrees Celsius, in some embodiments over a time period of about 30 minutes. The flow rate of perfusate 218 can then be incrementally increased, for example up to 1,500 mL/min over the next 30 minutes. However, prior to increasing the flow rate, the pressure readings of pulmonary artery 204 and left atrium 206 should be checked in order to prevent hydrostatic damage of lungs 202. For example, it is desirable that the atrial pressure of left atrium 206 is in the range of about 3 mm Hg to about 5 mm Hg and the arterial pressure of pulmonary artery 208 is in the range of about 10 mm Hg to about 15 mm Hg.

Once a temperature of about 32 degrees Celsius is reached, in some embodiments 20 minutes after the initialization of perfusion, ventilator 234 can be started and flow rate of perfusate 218 can be gradually increased. When ventilator 234 is started, the flow rate should be at least 20% of the target flow rate. The flow rate can continue to be increased to about 1,500 mL/min over a period of about 40 minutes. Once the desired flow rate of perfusate 218 has been reached, the flow of deoxygenation gas from tank 226 can be started. In some embodiments, the flow of the deoxygenation gas can be at a rate of between about 0.5 and about 1 liters per minute, more preferably about 1 liter per minute, and can be titrated to maintain the inflow of perfusate 218, in some embodiments between about 35 and about 45 mm Hg.

Once the temperature of perfusate 218 reaches body temperature (for example, about 37 degrees Celsius), the flow can continue to be increased stepwise over a period of time, such as about 30 minutes, to a desired flow rate. In some embodiments, the desired flow rate will be a predetermined percentage of predicted cardiac output, in some embodiments 40%; however, skilled persons will appreciate that the target can be calculated from the size of the lung capacity of donor lungs 202. Recruitment maneuvers can be used to recruit regions of lung atelectasis, in some embodiments to a maximum of 25 cm $H_2O$ of peak airway pressure.

An exemplary schedule for initialization of ex vivo organ perfusion system 200, during the first hour of perfusion, is shown in Table 1 (below) shows one suggested perfusion initialization schedule.

TABLE 1

Strategy for Initiation of Ex Vivo Lung Perfusion

| | Perfusion time (min) | | | | | | |
|---|---|---|---|---|---|---|---|
| | 0 | 10 | 20 | 30 | 40 | 50 | 60 |
| Perfusion temp. (° C.) | 20 | 30 | 32-35 | 37 | 37 | 37 | 37 |
| Flow (% calculated flow) | 10 | 10 | 20 | 30 | 50 | 80 | 100 |
| i.e.: 1,500 ml/min (ml) | 150 | 150 | 300 | 450 | 750 | 1,200 | 1,500 |
| Ventilation | None | None | Start | | | | Recruitment |
| Gas exchanger | None | None | Start | | | | |
| Left atrial pressure (mm Hg) | 3-5 | 3-5 | 3-5 | 3-5 | 3-5 | 3-5 | 3-5 |

Once initialization is completed, ex vivo organ perfusion system 200 is operated in a steady-state or maintenance period for a maintenance period of time. The maintenance period can also be considered the preservation and/or assessment period. In this phase, a lung-protective strategy of mechanical ventilation is used, in some embodiments using a tidal volume of between about 6 to about 8 mL/kg, a positive end-expiratory pressure (peep) of about 5 cm $H_2O$, a respiratory rate of 7 breaths per minute, and a fraction of inspired oxygen of about 21%. During steady-state, recruitment maneuvers can be performed every hour, in some embodiments to a peak airway pressure of about 25 cm $H_2O$. Imaging of the lung may occur during this period. For example, x-rays may be taken periodically, such as at about 1 hour and at about 4 hours.

During initialization and the steady-state operation of ex vivo organ perfusion system 200, the positive left atrial pressure can be maintained between about 3 mm Hg and about 5 mm Hg by adjusting the height of reservoir 216. In some embodiments, during initialization the revolutions per minute of pump 214 can be set to about 550 revolutions per minute and a clamp on left atrial cannula 232 is opened. In such embodiments, a slow trickle of perfusate 218 can begin to flow out of the left atrial cannula 232 and the revolutions per minute of pump 214 can be increased or decreased from this starting point in order to optimize flow. Skilled persons will appreciate that different tube lengths of left atrial cannula 232 can change the starting set point for the revolutions per minute of pump 214.

The flow rate of perfusate 218 is maintained at a calculated flow rate, which can be determined based on a predefined percentage of an estimated cardiac output, in some embodiments being about 40%. Skilled persons will appreciate that most lungs can be perfused at a non-pulsatile flow rate while generally maintaining acceptable low pulmonary artery pressures, in some embodiments in the range of about 10 mm Hg to about 15 mm Hg. In some embodiments, the cardiac output can be estimated at 100 mL/kg, and in other embodiments, for example in human lungs, the cardiac output can be estimated as 3 times the body surface area (assuming the target cardiac index is three).

Exemplary conditions for the operation of the steady-state phase of ex vivo organ perfusion system 200 are show in Table 2 (below). In some embodiments, the amount of perfusate 218 passing through deoxygenater 212 is in the range of about 50 mL to about 500 mL per hour. In a preferred embodiment, about 250 mL of perfusate 218 is circulated through system 200 every hour. At this rate, perfusate 218 can be exchanged and replaced by fresh perfusate components which have been metabolized, and which can maintain glucose and other nutrient levels. In other embodiments, every hour during the steady-state phase of ex vivo organ perfusion system 200, 500 mL of the circulated perfusate 218 can be removed and replenished with 500 mL of fresh perfusate 218.

Donor organs can be preserved, assessed, and/or maintained in this steady state for a maintenance period of up to 24 hours, more preferably up to 8 hours, and even more preferably, up to 3 hours.

TABLE 2

EVLP Maintenance Strategy-Settings

| Measure | Setting |
| --- | --- |
| Tidal volume | 6-8 ml/kg |
| PEEP | 5 cm $H_2O$ |
| Respiratory rate | 7 breaths/min |
| $FiO_2$ | 21% |
| Flow rate | 40% of estimated cardiac output |
| LAP | 3-5 mm Hg |
| PAP | 10-15 mm Hg |
| Recruitments | To PawP of 25 cm $H_2O$ |

PEEP, positive end-expiratory pressure; $FiO_2$, fraction inspired of oxygen; LAP, left atrial pressure; PAP, pulmonary mean artery pressure; Inflow $P_{CO_2}$, partial pressure of carbon dioxide in the inflow perfusate. Recruitments were performed by 2 inspiratory holds of 15 seconds to a PawP (peak airway pressure) of 25 cm $H_2O$ every hour.

During operation of ex vivo organ perfusion system 200, the status and functional characteristics of lungs 202 can be evaluated at predetermined intervals, in some embodiments every hour. A recruitment maneuver can additionally be performed at predetermined intervals prior to each evaluation, in some embodiments 10 minutes prior to each evaluation in order to recruit any atelectatic (collapsed) areas of the lung and to optimize ventilation/perfusion matching. In some embodiments, recruitment maneuvers can be performed to a peak airway pressure of 25 cm $H_2O$ until areas of atelectasis are recruited. In some embodiments, this can be performed by increasing the tidal volume and then using the inspiratory hold function for about 10-15 sections on the ventilator to deliver the recruitment breath.

The function of lungs 202 can be assessed as part of EVOP system 200. When checking the function of lungs 202 according to the embodiment shown, the following parameters can be recorded: (i) the rate of change of lung oxygen capacity, measured as the rate of change of the ratio of partial pressure of arterial oxygen to the fraction of inspired oxygen ($PO_2/FIO_2$); (ii) the pulmonary vascular resistance (PVR) multiplied by 80 divided by the pulmonary artery flow; (iii) the peak airway pressure (PawP); and (iv) the airway plateau pressure (Pplat). In some embodiments, the function of lungs 202 can be evaluated by adding irradiated red blood cells to perfusate 218, in some embodiments 12 hours after initializing ex vivo organ perfusion system 218, to evaluate the correlation of the function of lungs 202 using acellular and cellular lung perfusion. It is important to note that dynamic and static lung compliance, peak airway pressure and pulmonary vascular resistance are earlier and more sensitive markers to reflect lung improvement or deterioration than $PO_2$. It is thus useful to monitor all of these parameters carefully and accurately.

After the final evaluation, ex vivo organ perfusion system 200 is terminated by cooling down lungs 202, in some embodiments cooling down lungs to between 10 and 20 degrees Celsius. After cooling down lungs 202, the flow of perfusion can be stopped and ventilator 234 is turned off. The trachea of lungs 202 can be clamped to maintain the lungs in an inflated state. The now ready for transplant lungs 202 can be stored, in some embodiments being stored at 4 degree Celsius in Perfadex™ until transplantation in a sterile organ bag which may be surrounded by ice. Exemplary parameters for evaluating the function of lungs 202 are shown in Table 3 and FIGS. 3A-3D.

TABLE 3

| Property | Value at 2 Hours | Value at 12 Hours |
| --- | --- | --- |
| $\Delta PO_2/FIO_2$ | 434.2 +/− 22 mmHg | 468.1 +/− 13.5 mmHg |
| PVR | 593.8 +/− 66.9 dynes/s/$cm^5$ | 537.1 +/− 56.3 dynes/s/$cm^5$ |
| PawP | 10.8 +/− 0.5 cm $H_2O$ | 11.1 +/− 0.4 cm $H_2O$ |
| Pplat | 10.33 +/− 0.6 cm $H_2O$ | 11.0 +/− 0.6 cm $H_2O$ |

During ex vivo organ perfusion, injured organs can be repaired during a treatment period using any one or a combination of treatments. In this way, an aspect of the present invention is the treatment of an ex vivo organ rather than the whole body. The skilled person would understand that repairing organs according to the present invention can be suitable to treat an organ of a living donor with the intention of returning the repaired organ to the original donor.

An example of a treatment that can be used in combination with EVOP is gene therapy. Gene therapy with adenoviral vector performed in the ex vivo system provides superior uptake and expression of the gene. For example, the injury response of the ex vivo lung is superior to gene therapy done in vivo in the donor. Gene therapy ex vivo avoids exposure of the donor and other organs to the vector and gene therapy. Further, gene therapy can decrease the risk of acute lung injury after transplantation and its attendant complications. In embodiments where the organ is a lung, IL-10 gene therapy, or other suitable cytokines, can decrease inflammation of the lung and can restore tight junctions of the lung. For example, inflammation and disruption of the blood-alveolar barrier in the lung are common in injured human donor lungs that have been rejected for transplantation. Such injuries can occur before removal of the lung from the donor as well as during the preservation period. Using IL-10 gene therapy in a perfused lung can result in a decrease of IL-1β, IL-8, and/or IL-6 concentrations in the lung tissue.

In some embodiments, a second-generation (E1, E3 deleted), replication-deficient adenoviral vector (serotype 5) under the control of a cytomegalovirus promoter, or other suitable promoter, and containing the human IL-10 gene can be used. The adenoviral vector can then be diluted in about 20 ml of normal saline.

In order to deliver the gene therapy, in some embodiments a bronchoscope, such as a flexible fibre-optic bronchoscope, can be inserted through an endotracheal tube inserted in lungs 202 during the perfusion process. A fine catheter can then be inserted through the bronchoscope channel and can be used to deliver about 1 mL of the vector into each segmental bronchus. After the vector has been delivered, a recruitment maneuver (or an inspiratory hold) can be performed to an airway pressure of about 25 cm $H_2O$ and lungs 202 can be ventilated with a tidal volume of about 10 mL/kg at about 14 bpm for about 15 minutes which can facilitate distribution of the vector through lungs 202.

Treatment of donor organ 102 can occur for a treatment period of time, the length of which will depend on the condition of the organ and the injury being treated. For example, when donor organ 102 is donor lung 202 and being treated by gene therapy, the treatment period of time can be from about 1 hour to about 24 hours, more preferably between 4 hours and about 12 hours, and even more preferably between about 2 hours and about 4 hours.

Process 100 together with EVOP system 200 as described above can also be useful to improve the condition of donor organ 102, whether donor organ 102 is injured or high risk or generally transplantable. For example, in the case of donor lung 202, lung capacity values ($PO_2$:$FIO_2$) can be improved, pulmonary edema can be reduced, consolidation can be reduced, and/or atelectasis can be achieved. Such improvement can occur during the maintenance period without treatment or can occur during part or all of both the maintenance period and the treatment period. Improvement can also occur during or substantially during the treatment period. For example, such improvements can be achieved between about 1 hour and about 3 hours of the maintenance period of EVLP.

When a donor organ being held in the maintenance period is treated, the maintenance period may be shortened accordingly. After the treatment period, a maintenance period may be initiated, resumed, or repeated. Assessment of the donor organ can occur throughout, or through part of, the maintenance and/or treatment periods.

Organs that have been preserved, assessed, maintained, repaired, and/or improved by the processes and systems described herein also fall within the scope of this invention. For example, a lung maintained by the EVOP system for a period of time, such as 1 hour or 4 hours, or longer, can have improved lung capacity ($PO_2$:$FIO_2$) over time compared to a lung suitable to transplant with being subjected to EVOP, a lung maintained by standard hypothermic conditions, or an injured lung not originally suitable to transplant. For example, a lung maintained by the EVOP system can have improved lung function parameters, a reduction of inflammatory cells content, improved lung microcirculation, restored cell tight junctions, and other parameters targeted for preconditioning for transplantation.

Experiment Section

Study Design

In this single-institution, prospective, nonrandomized trial, we compared outcomes in recipients of high-risk donor lungs that had been subjected to normothermic ex vivo lung perfusion (EVLP) and contemporaneous recipients of conventionally assessed lung transplants. Donor lungs that met the entry criteria (i.e., were at high risk for nonuse) were retrieved, delivered to our center by means of standard cold-storage transport in a low-potassium dextran solution (Perfadex, Vitrolife), and perfused in the EVLP system for 4 hours. Lungs were considered suitable for transplantation if during EVLP the $PO_2$:$FIO_2$ ratio that is, the partial pressure of oxygen ex vivo ($PO_2$) to the fraction of inspired oxygen ($FIO_2$)—was 350 mm Hg or more and if deterioration from baseline levels of all three physiological measurements (pulmonary vascular resistance, dynamic compliance, and peak inspiratory pressure) was less than 15% while the lungs were ventilated with the use of a tidal volume of 7 ml per kilogram of donor body weight and a rate of 7 breaths per minute during the perfusion period.

Recipients provided written informed consent to participate in this study in accord with the protocol, which was approved by the University Health Network research ethics board (Toronto, Ontario, Canada). Recipients were chosen sequentially, independently of their assignment to either the EVLP group or the control group, and were selected on the basis of blood type, size of the organ (total lung capacity), and waiting-list status, in keeping with our usual practice. Group assignments were based solely on whether the donor lung met the entry criteria; if it did, it was implanted in the intended recipient after EVLP. There was one exception, since one recipient had not provided consent for participation (>90% of patients on the waiting list provided consent during the pretransplantation visits). In that case, the next recipient was chosen. A separate consent form was used for the three initial patients in the safety and feasibility study. Recipients were informed before transplantation that they would be receiving EVLP lungs. After the lungs were transplanted, standard care was provided in both groups, including fluid management, antibiotic prophylaxis, immunosuppression, and surveillance bronchoscopy.

Inclusion and Exclusion Criteria

Donors

High-risk donor lungs were defined as those meeting any one of the following criteria: best ratio of the partial pressure of arterial oxygen ($PaO_2$) to $FIO_2$ of less than 300 mm Hg; pulmonary edema, defined as bilateral interstitial infiltrates without evidence of infection, detected on the last chest radiograph by the lung-transplantation physician assessing the donor; poor lung deflation or inflation during direct intraoperative visual examination at the donor site; blood transfusions exceeding 10 units; and donation after cardiac death, as defined by Maastricht category III (donor without a heartbeat and with cardiocirculatory death imminent after withdrawal of treatment) or category IV (cardiocirculatory death in a brain-dead donor). Donor lungs with established pneumonia, severe mechanical lung injury (i.e., contusions in more than one lobe), or gross gastric aspiration were excluded from this particular study. Donor age was neither an exclusion nor an inclusion criterion.

The severity of donor risk factors was compared between the groups using a known donor score calculation based on smoking, chest radiographic findings, bronchopulmonary secretions, and arterial blood gas measurements. The score ranges from 0 to 18, with higher scores indicating more risk factors; a maximum score of 7 was considered to be the cutoff level for transplant acceptability.

Recipients

All patients on our waiting list for single or bilateral transplantation or re-transplantation were eligible. Candidates for combined heart-lung transplantation were excluded.

Study Logistics

Donor lungs were offered to our lung-transplantation program through our provincial organ procurement organization (Trillium Gift of Life Network). Assessment of potential donor lungs was based on the usual constellation of clinical factors, including history, $PaO_2$:$FIO_2$, bronchoscopic findings, radiologic assessment, and direct examination of the lung during procurement. As is our practice, we pretreated all potential lung donors with glucocorticoids (methylprednisolone, 15 mg per kilogram of body weight given intravenously every 24 hours); according to the ICU policy of the donor hospital, antibiotics were given to donors if a specific organism had been identified on bronchoalveolar lavage. Donor lungs were included in the EVLP group only after a complete assessment by our team was carried out at the donor hospital before harvesting. Once accepted for EVLP, donor lungs were transported to our center, where a team of trained nurses, perfusionists, and transplantation surgeons had prepared the EVLP system in a sterile operating room. All lung-transplantation surgeons were aware of the design and objectives of the study.

A safety and logistic feasibility study was first performed in three patients who underwent bilateral lung transplantation, with the use of standard criteria for donor lungs. One lung was transplanted according to conventional practice, and the other was transplanted after 1 hour of EVLP. Post-transplantation chest radiographs and bronchoscopic inspection of the anastomosis in the lungs transplanted according to conventional practice and the lungs transplanted after EVLP were similar.

Ex Vivo Lung Perfusion

Perfusate

The circuit was primed with 2 L of Steen Solution™ (XVIVO, Vitrolife), a buffered dextran containing extracellular-type solution with an optimized colloid osmotic pressure developed specifically for EVLP. In addition, 500 mg of Solumedrol (Sandoz, USA), 500 mg of Primaxin (Merck, USA) and 3000 IU of Heparin (Organon, Canada) were added to the perfusate. Every hour after the initiation of EVLP, 500 ml of circulated perfusate was removed and replenished with 500 ml of fresh solution.

Technique

After the lungs were transferred to the XVIVO chamber (Vitrolife), the left atrial (LA) cannula was connected to the circuit. Flow was initiated slowly in a retrograde fashion to de-air through the pulmonary artery (PA) cannula. The PA cannula was then connected to the circuit and anterograde flow was started at 150 mL/min with the perfusate at room temperature. The temperature of the perfusate was then gradually increased to 37° C. When 32° C. was reached (usually over 30 min), ventilation was started and the perfusate flow rate was gradually increased. The flow of gas used to deoxygenate and provide carbon dioxide to the inflow perfusate via a gas exchange membrane was then initiated at 1 L/min. We used 40% of the estimated donor cardiac output (CO) as the target maximum maintenance perfusate flow rate to perfuse both lungs. A positive LA pressure was maintained between 3 and 5 mmHg by adjusting the height of the hard-shell reservoir. A protective mode of mechanical ventilation was applied using a tidal volume of 7 mL/kg (based on donor ideal body weight), at 7 breaths per min, positive end-expiratory pressure (PEEP) of 5 cmH$_2$O and an inspired oxygen fraction (FIO$_2$) of 21%. The lungs were recruited with inspiratory holds to a peak airway pressure (PawP) of 20 cmH$_2$O every hour. The pH, pCO$_2$, electrolytes and glucose were maintained at physiologic levels in the perfusate.

After 4 hours of EVLP, the lungs were cooled to 10° C. over a period of 10 minutes. Thereafter, perfusion and ventilation were stopped (with FIO$_2$ changed to 50% for the purpose of lung storage), —and the trachea was clamped at full inspiration to maintain the lungs in a state of inflation. The lungs were then stored at 4° C. in Perfadex™ until transplantation.

Ex Vivo Functional Assessment

For the functional assessment ex vivo, tidal volume was set at 10 mL per kilogram of donor body weight and 10 breaths per minute, with FIO$_2$ at 1.0. Lung function was evaluated hourly during EVLP according to the following calculations: P0$_2$. [left atrial PO$_2$-pulmonary-artery PO$_2$ (in mm Hg)], and pulmonary vascular resistance=[(pulmonary-artery pressure-left atrial pressure)×80]÷pulmonary-artery flow (in dynes·seconds·cm$^{-5}$), dynamic compliance (in milliliters per centimeter of water), and peak inspiratory pressure (in centimeters of water). Radiography of the ex vivo lung and flexible bronchoscopy were performed at 1 hour and 3 hours of EVLP.

Study End Points

The primary end point was primary graft dysfunction of grade 2 (PaO$_2$:FIO$_2$ of 200 to 300 mm Hg) or grade 3 (PaO$_2$:FIO$_2$<200 mm Hg), according to the International Society for Heart and Lung Transplantation classification (ISHLT), at 72 hours after transplantation Grades 0 and 1 represent good graft function (PaO$_2$:FIO$_2$>300 mm Hg) without abnormalities on chest radiographs (grade 0) or with radiographic abnormalities (grade 1). Secondary end points were PaO$_2$:FIO$_2$ at the time of arrival in the ICU and at 24 hours, and 48 hours after lung transplantation; the need for extracorporeal membrane oxygenation; bronchial complications requiring intervention; duration of mechanical ventilation; length of stays in the ICU and hospital; and mortality at 30 days.

Statistical Analysis

All statistics were calculated with GraphPad Prism 5, with results expressed as medians and ranges. A nonparametric Mann-Whitney test was performed to compare numerical data; Fisher's exact test was used for categorical data. Percentage-point differences (with 95% confidence intervals) are provided for study end points expressed as proportions. A post hoc analysis was performed to compare the effects of EVLP stratified according to the two subgroups of donors—those without a heartbeat and those who were brain-dead. For differences in lung function at several time points over the 4-hour period of EVLP, repeated-measures analysis of variance was used. P values of less than 0.05 were considered to indicate statistical significance.

Results

Donor Lungs

Figure 4:
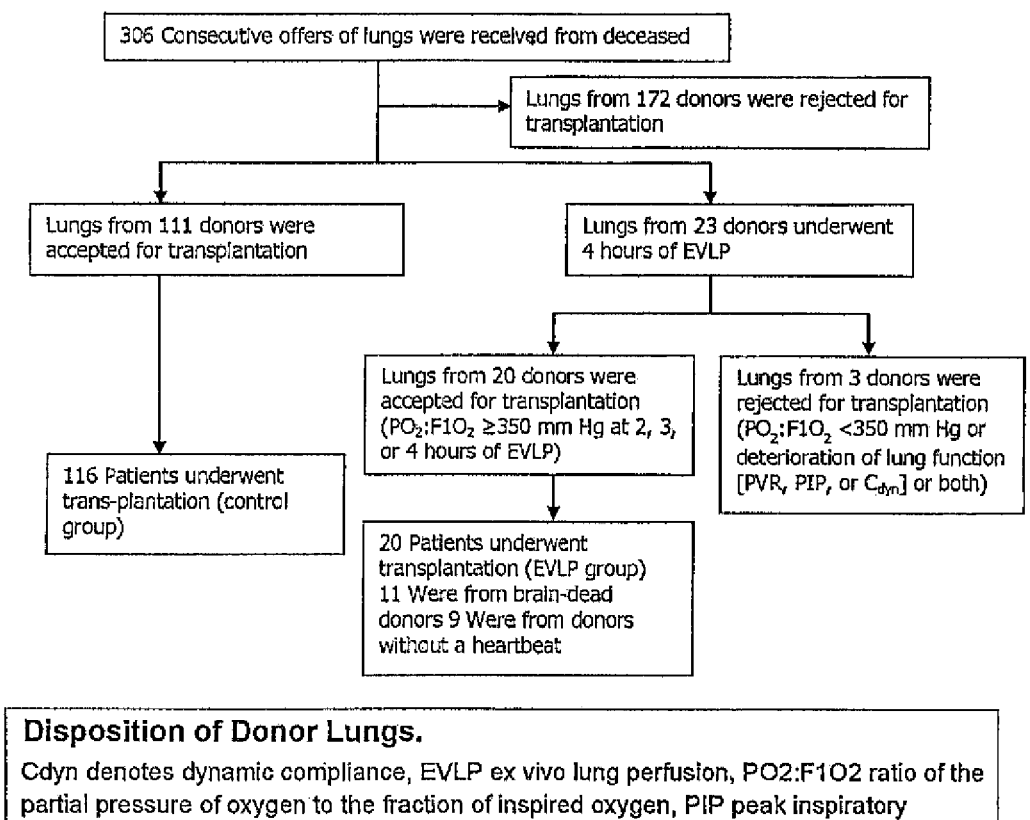
FIG. 4 is a representation of the process of selecting lungs for ex vivo lung perfusion according to an embodiment of the present invention.

From September 2008 through January 2010, lungs from 306 multiorgan donors were offered to our program, and 136 lung transplantations were performed. Lungs from 23 donors were identified as high-risk on the basis of entry criteria and were evaluated for 4 hours while being perfused in the EVLP system. Twenty of these lungs had physiologically stable pulmonary function and were accepted for transplantation (FIG. 4); 9 were from donors without a heartbeat (Maastricht category III, 45%) and 11 were from brain-dead donors (Maastricht category IV, 55%).

Donor age and status with respect to smoking did not differ significantly between the EVLP group and the control group, but there were significant between-group differences in donor lung characteristics at baseline (Table 4).

Donor lungs in the EVLP group had significantly worse gas exchange and more radiographic and bronchoscopic abnormalities (e.g., mucopurulent or bloody airway secretions and evidence of charcoal aspiration). Within the EVLP group, lungs from donors without a heartbeat had higher PaO$_2$:FIO$_2$ values and lower donor scores than did lungs from brain-dead donors.

TABLE 4

Donor, Recipient, and Transplantation Characteristics of Ex Vivo Lung Perfusion (EVL) Lungs and Control Lungs.*

| Characteristic | Lungs from Donors without a Heartbeat (N = 9) | EVLP Lungs (N = 20) Lungs from Brain-Dead Donors (N = 11) | Total (N = 20) | Control Lungs (N = 116) | P Value† |
|---|---|---|---|---|---|
| Donor | | | | | |
| Age (yr) | | | | | 0.07 |
| Median | 40 | 38 | 39 | 45 | |
| Range | 16-68 | 17-69 | 16-69 | 6-79 | |
| Best $PaO_2:FiO_2$ (mm Hg) while in donor | | | | | <0.001 |
| Median | 420 | 275 | 335 | 459 | |
| Range | 195-532 | 160-469 | 160-532 | 290-590 | |
| Abnormal chest radiograph (%) | 33 | 91 | 70 | 45 | 0.05 |
| Abnormal bronchoscopic results (%) | 89 | 91 | 90 | 52 | 0.001 |
| Smoking history >10 packs/day (%) | 33 | 9 | 20 | 23 | 0.78 |
| Positive culture on bronchoalveolar lavage (%) | 78 | 82 | 80 | 60 | 0.04 |
| Donor score‡ | | | | | <0.001 |
| Median | 5 | 8 | 8 | 3 | |
| Range | 1-9 | 2-10 | 1-10 | 1-9 | |
| Recipient | | | | | |
| Age (yr) | | | | | 0.81 |
| Median | 52 | 57 | 56 | 56 | |
| Range | 28-69 | 36-66 | 28-69 | 19-73 | |
| Diagnosis of pulmonary fibrosis (%) | 33 | 36 | 35 | 37 | 0.65 |
| UNOS lung-allocation score§ | | | | | 0.22 |
| Median | 34 | 37 | 35 | 33 | |
| Range | 31-57 | 29-72 | 29-72 | 26-71 | |
| Transplantation | | | | | |
| Bilateral transplantation (%) | 89 | 63 | 75 | 85 | 0.36 |
| Retransplantation (%) | 0 | 9 | 5 | 4.3 | 0.81 |
| Total preservation time (min) | | | | | <0.001 |
| Median | 632 | 703 | 653 | 370 | |
| Range | 267-760 | 467-1021 | 267-1021 | 163-662 | |

*$PaO_2:FiO_2$ denotes ratio of the partial pressure of arterial oxygen to the fraction of inspired oxygen, and UNOS United Network for Organ Sharing.
†P values are for comparisons of all EVLP lungs with control lungs and were calculated with the use of Fisher's exact test for discrete variables and the Mann-Whitney test for continuous variables.
‡The donor score ranges from 0 to 18 and is based on age, status with respect to a history of smoking, $PaO_2:FiO_2$, chest radiographs, and bronchoscopic findings; higher scores indicate the presence of more risk factors.[23]
§The UNOS lung-allocation score ranges from 0 to 100, with higher numbers indicating worse clinical status and greater potential transplantation benefit.

Figure 5:
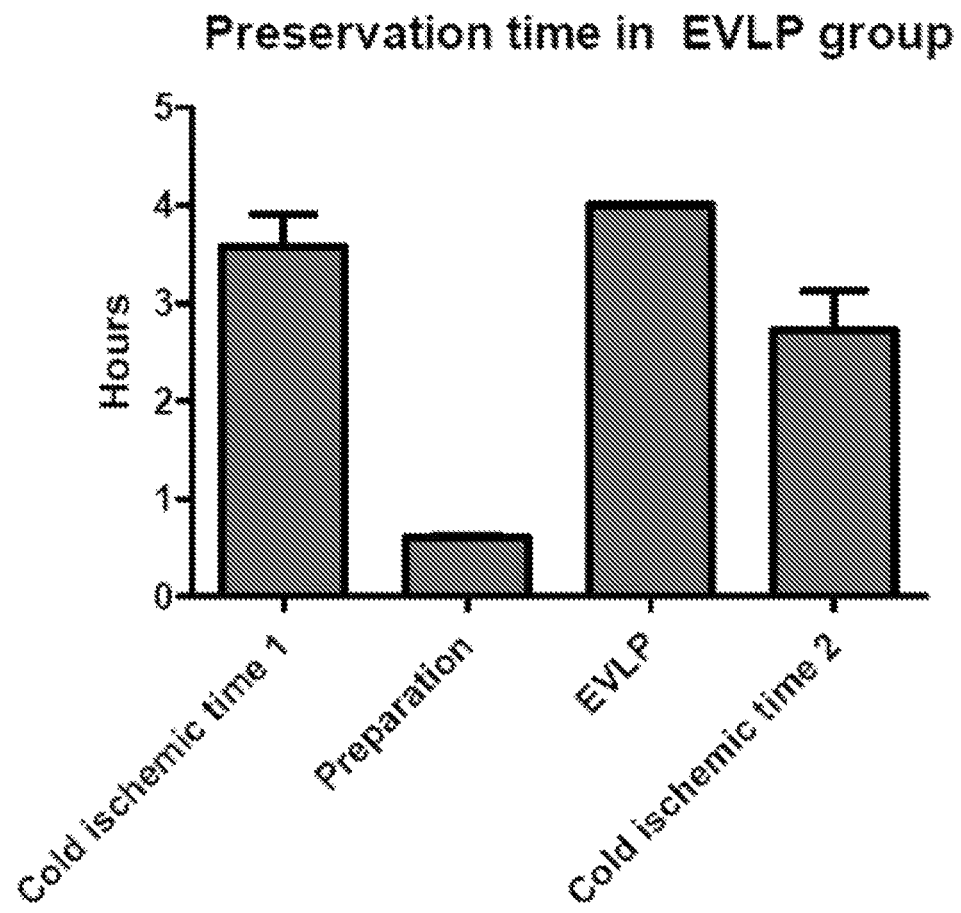
FIG. 5 is a chart showing preservation times of lungs subjected to ex vivo lung perfusion according to an embodiment of the present invention.

The median time from harvest to implantation for the EVLP group was 653 minutes (range, 267 to 1021) versus 370 minutes (range, 163 to 662) for the control group (P<0.001). The three preservation periods (i.e., cold ischemic time 1, EVLP time, and cold ischemic time 2) for the EVLP group are shown in FIG. 5.

Lung Function During EVLP

Figure 6:
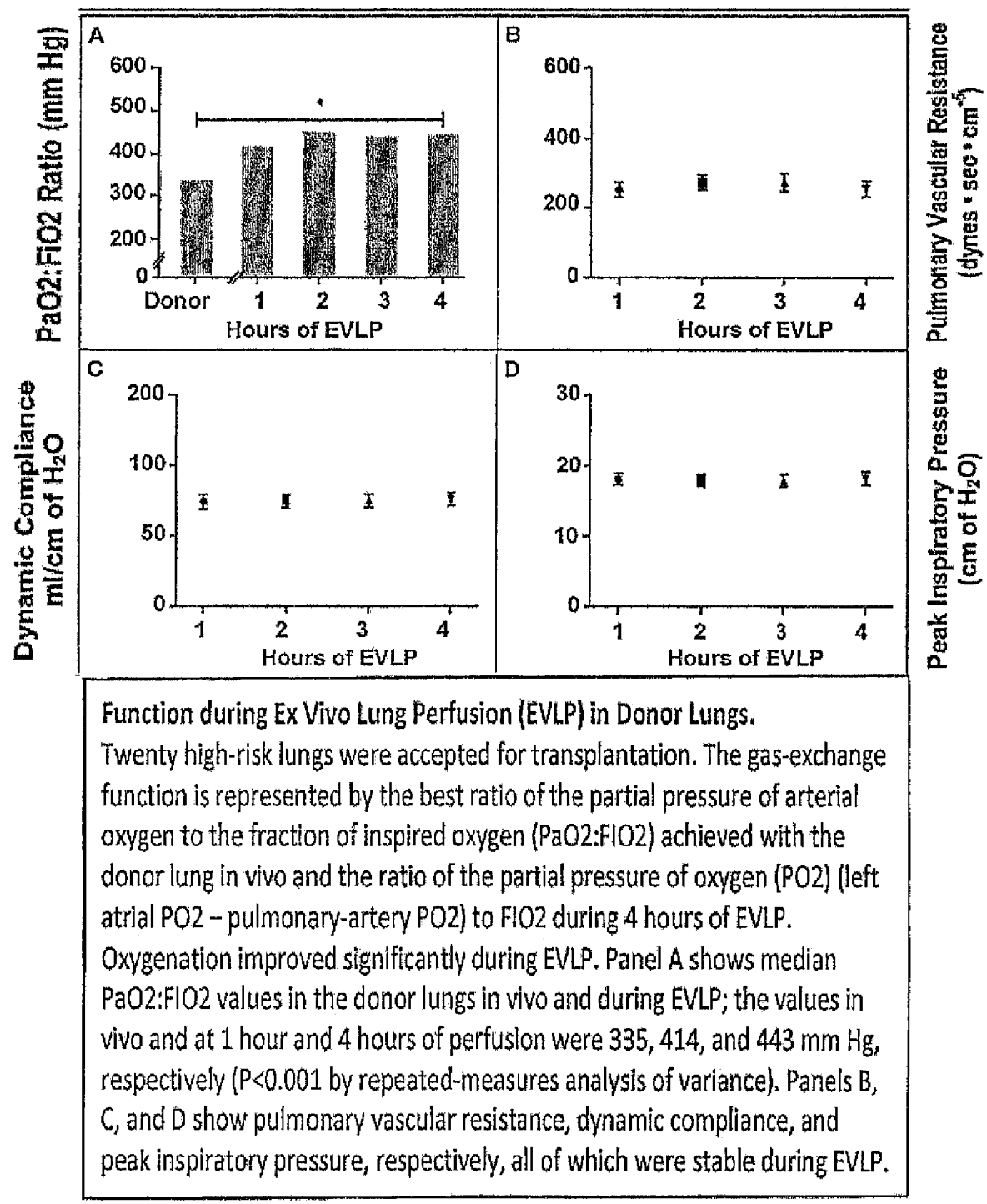
FIGS. 6 A, B, C, and D are graphs showing lung function of lungs subjected to ex vivo lung perfusion according to an embodiment of the present invention.

There was significant improvement in gas exchange during EVLP in the 20 lungs used for transplantation (FIG. 6). The median $PaO_2:FIO_2$ while the lungs were still in the donors was 335 mm Hg; after 1 hour and 4 hours of EVLP, the $PO_2:FIO_2$ increased to 414 and 443 mm Hg, respectively (P<0.001). In addition, pulmonary vascular resistance, dynamic compliance, and peak inspiratory pressure were stable throughout the 4 hours of EVLP in all 20 lungs used for lung transplantation. Lung function worsened in 3 of the 23 donor lungs, with the EVLP $PO_2:FIO_2$ decreasing to less than 350 mm Hg in some cases, and these lungs were not transplanted. The 20 lungs selected for transplantation showed stable or improved radiographic findings during EVLP (e.g., reduced pulmonary edema or decreased consolidation and atelectasis between 1 hour and 3 hours of EVLP).

Clinical Outcome in the EVLP Group

Primary graft dysfunction was defined as impaired gas exchange meeting ISHLT criteria for grade 2 or 3 dysfunction ($PaO_2:FIO_2$<300 mm Hg) after lung transplantation, in the absence of other causes of impaired gas exchange. The incidence of primary graft dysfunction 72 hours after lung transplantation tended to be lower in the recipients of EVLP lungs than in the controls (15% vs. 30.1%; 95% confidence interval [CI], 2.6% to 32.8%; P=0.11) (Table 5). None of recipients in the EVLP group had severe primary graft dysfunction at 72 hours ($PaO_2:FIO_2$<200 mm Hg), as compared with 9.4% of controls (P=0.36). A post hoc analysis of the effects of EVLP stratified according to donor subgroup (i.e., donors without a heartbeat and brain-dead donors) (Table 5) showed no significant difference in primary graft dysfunction, although the statistical power of the study to detect such a difference was low.

With regard to secondary end points, there were no significant differences between the EVLP and control groups in the occurrence of primary graft dysfunction at the other three time points (at ICU arrival and 24 and 48 hours after transplantation) (Table 5). None of the patients with EVLP lung transplants had gas-exchange abnormalities sufficient to warrant extracorporeal membrane oxygenation. The incidence of bronchial complications requiring intervention (e.g., dilation) was similar in the EVLP and control groups (5% and 4%, respectively; P=1.0), and no significant differences between

TABLE 5

Outcomes in the EVLP and Control Groups.*

| End Point | Donors without a Heartbeat (N = 9) | EVLP Lungs (N = 20) Brain-Dead Donors (N = 11) | Total (N = 20) | Control Lungs (N = 116) | Absolute Difference† percentage points (9.5% CI) | P Value‡ |
|---|---|---|---|---|---|---|
| Primary end point§ | | | | | | |
| PGD grade 2 or 3 at 72 hr (%) | 11 | 18 | 15 | 30 | 15 (−3 to 33) | 0.11 |
| Secondary end points§ | | | | | | |
| PGD grade 2 or 3 at ICU arrival (%) | 33 | 18 | 25 | 30 | 5 (−15 to 26) | 0.30 |
| PGD grade 2 or 3 at 24 hr (%) | 11 | 18 | 15 | 36 | 21 (3 to 39) | 0.07 |
| PGD grade 2 or 3 at 48 hr (%) | 33 | 27 | 30 | 35 | 5 (−17 to 27) | 0.46 |
| ECMO (%) | 0 | 0 | 0 | 4 | | 0.37 |
| PaO$_2$:FiO$_2$ on arrival in ICU (mm Hg) | | | | | | 0.51 |
| Median | 420 | 423 | 422 | 372 | | |
| Range | 85-518 | 86-538 | 85-538 | 49-591 | | |
| Mechanical ventilation after transplantation (days) | | | | | | 0.15 |
| Median | 2 | 2 | 2 | 2 | | |
| Range | 1-27 | 1-101 | 1-101 | 1-43 | | |
| ICU stay after transplantation (days) | | | | | | 0.68 |
| Median | 4 | 5 | 4 | 4 | | |
| Range | 1-34 | 1-101 | 1-101 | 1-103 | | |
| Hospital stay after transplantation (days) | | | | | | 0.39 |
| Median | 19 | 34 | 23 | 27 | | |
| Range | 7-54 | 11-101 | 7-101 | 9-156 | | |
| Airway complications (%)¶ | 11 | 0 | 5 | 4 | −1 (−10 to 10) | 1.0 |
| Mortality at 30 days (%) | 22 | 0 | 10 | 5 | −5 (−19 to 9) | 0.33 |

*ECMO denotes extracorporeal membrane oxygenation, ELVP ex vivo lung perfusion, ICU intensive care unit, and PGD primary graft dysfunction.
†The differences between all EVLP lungs and control lungs are shown in percentage points (with 95% confidence intervals [CI]) for each study end point.
‡P values were calculated with the use of Fisher's exact test for discrete variables and the Mann-Whitney test for continuous variables and are for the comparison between all EVLP lungs and control lungs.
§Primary graft dysfunction was defined as a ratio of the partial pressure of arterial oxygen to the fraction of inspired oxygen (PaO$_2$:FiO$_2$) of less than 300 mm Hg, according to the International Society for Heart and Lung Transplantation classification.[25] Grade 0 indicates PaO$_2$:FiO$_2$ ≥ 300 mm Hg with clear chest radiographs, grade 1 PaO$_2$:FiO$_2$ ≥ 300 mm Hg with infiltration on chest radiographs, grade 2 PaO$_2$:FiO$_2$ ≥ 200 but <300 mm Hg and grade 3 PaO$_2$:FiO$_2$ <200 mm Hg.
¶Airway complications were defined as those requiring interventions, such as bronchial dilation.

the groups were observed in the median duration of post-transplantation mechanical ventilation (2 days for both groups, P=0.15), length of stay in the ICU (4 days for both, P=0.68), and hospital length of stay (23 and 27 days, respectively; P=0.39). Two of 20 patients (10%) died within 30 days after transplantation in the EVLP group, as compared with 6 of 116 in the control group (5.2%, P=0.33). Two of the patients who received EVLP lungs died; one patient died on day 7 after lung transplantation, owing to gram-negative sepsis unrelated to the donor, and the other died on day 16 from massive retroperitoneal bleeding due to anticoagulation therapy for atrial fibrillation. Both causes of death were confirmed by autopsy. No serious adverse events were directly related to EVLP. The survival rate at 1 year was 80% in the EVLP group and 83.6% in control group (P=0.54); 15 of the 20 recipients of EVLP lungs (75%) and 94 of the 116 controls (81%) survived, with median follow-up times of 561 days (range, 7 to 821) and 542 days (range, 9 to 828), respectively.

In summary, during the study period, 136 lungs were transplanted. Lungs from 23 donors met the inclusion criteria for EVLP; in 20 of these lungs, physiological function remained stable during EVLP and the median PO$_2$:FIO$_2$ ratio increased from 335 mm Hg in the donor lung to 414 and 443 mm Hg at 1 hour and 4 hours of perfusion, respectively (P<0.001). These 20 lungs were transplanted; the other 116 lungs constituted the control group. The incidence of primary graft dysfunction 72 hours after transplantation was 15% in the EVLP group and 30% in the control group (P=0.11). No significant differences were observed for any secondary end points, and no severe adverse events were directly attributable to EVLP.

DISCUSSION

Lung transplantation is limited by the shortage of available organs and by complications that occur after transplantation, such as primary graft dysfunction. The condition of the transplanted lung during the perioperative period strongly influences both short-term and long-term outcomes. In this study, we found that it was feasible to improve the outcome of transplantation if lungs from donors without a heartbeat or brain-dead donors were subjected to 4 hours of normothermic ex vivo perfusion during the organ-preservation or maintenance phase.

To confirm that donor lung function was adequate for transplantation, we used a combination of physiological variables that addressed gas exchange (PO$_2$:FIO$_2$>350 mm Hg), pulmonary mechanics (stable peak inspiratory pressure and dynamic compliance), and pulmonary vasculature (stable pulmonary vascular resistance). One advantage of EVLP is that it can be used to identify lungs that are not suitable for transplantation. Indeed, two of the three lungs that were rejected after EVLP appeared to function reasonably well on the basis of assessments carried out while the lungs were still in vivo (i.e., the PaO$_2$:FIO$_2$ was adequate and the chest radiograph was normal), but because they were obtained from donors without a heartbeat, they were included in the study. However, these lungs were not transplanted because pulmonary vascular resistance, peak inspiratory pressure, or dynamic compliance deteriorated during EVLP.

We chose primary graft dysfunction at 72 hours as the primary end point on the basis of evidence suggesting that it is the best determinant of early outcomes: 30-day mortality was 36% among patients with grade 3 primary graft dysfunction at 72 hours versus 5% among patients without grade 3 dysfunction. In the patients in our study who received lungs assessed during EVLP, the incidence of primary graft dysfunction was low, and severe dysfunction (grade 3) at 72 hours was absent, despite the fact that the function of the EVLP lungs was significantly more impaired at baseline (on the basis of the donor score) than that of the control lungs. In light of the confidence intervals for the differences between the two groups (95% CI, −3% to 33%), we are 97.5% confident that the incidence of primary graft dysfunction in the EVLP group was not more than 3% higher than that in the control group. Other measures of the outcome in recipients, such as the number of days of mechanical ventilation and the duration of the ICU and hospital stays, were also acceptable and were similar in the two groups. Mortality at 30 days was 10% in the EVLP group twice that in the control group; however, this difference represented only one excess death, and the causes of death, as assessed on autopsy, were not directly related to graft dysfunction.

Our study involved a normothermic, acellular, blood-free perfusate; protective perfusion and ventilation strategies; and a prolonged perfusion time. This approach was associated with gradual improvement in the function of most of the lungs that were subjected to EVLP.

The few series of cases of lung transplantation involving lungs from donors without a heartbeat (Maastricht category III) have indicated early outcomes; however, one recent study showed increased rates of primary graft dysfunction, as well as increased in-hospital mortality. Therefore, most lung-transplantation centers do not use lungs from donors without a heartbeat. Indeed, we were hesitant to transplant such lungs, even if they seemed otherwise adequate, until we were able to assess lung function using EVLP.

In conclusion, our study shows that the use of extended normothermic EVLP allows an objective assessment of high-risk donor lungs. When these lungs are transplanted, acceptable rates of primary graft dysfunction are achieved, and the early outcomes are similar to those with conventionally selected and transplanted lungs.

The present invention has been described with regard to specific embodiments; however, it will be obvious to persons skilled in the art that a number of variants and modifications can be made without departing from the scope of the invention as described herein.

What is claimed is:

1. An ex vivo Maastricht category III or Maastricht category IV lung for transplantation to a human recipient, comprising: (i) a substantially bloodless perfusate at body temperature, (ii) exogenous stem cells, (iii) an exogenous transgene encoding a cytokine, and (iv) at least one of a partial pressure of arterial oxygen to fraction of inspired oxygen ($PO_2$:$FIO_2$) ratio less than 300 mm Hg, pulmonary edema, injury, or inflammation, wherein the lung is from a human donor and the exogenous stem cells are from a source other than the donor and a source other than the recipient.

2. The ex vivo lung of claim 1, wherein the lung further comprises a replication deficient adenoviral vector (serotype 5) for delivery of the exogenous transgene into the cells of the lung.

3. The ex vivo lung of claim 1, wherein the exogenous transgene encodes IL-10.

4. The ex vivo lung of claim 3, wherein expression of IL-10 in the cells of the ex vivo lung is at a level that is greater than a level of expression of IL-10 in a corresponding ex vivo lung that does not comprise the exogenous transgene.

5. The ex vivo lung of claim 4, wherein the cells of the ex vivo lung express IL-1β, IL-8 and/or IL-6 at a level of expression that is less than the level of expression in a corresponding ex vivo lung that does not comprise the exogenous transgene.

6. The ex vivo lung of claim 1, wherein the ex vivo lung comprises at least one of antibiotics, beta-agonists, and/or anti-inflammatory agents.

7. The ex vivo lung of claim 1, wherein the ex vivo lung is the Maastricht Category IV lung.

8. The ex vivo lung of claim 7, wherein the ex vivo lung is an uncontrolled Maastricht Category IV lung.

9. An ex vivo Maastricht category IV lung for transplantation to a human recipient, comprising (i) a substantially bloodless perfusate at body temperature, (ii) exogenous stem cells, (iii) a human IL-10 exogenous transgene, wherein the exogenous transgene is in a replication deficient adenoviral vector (serotype 5) under control of a cytomegalovirus promoter, (iv) at least one of antibiotics, beta-agonists and/or anti-inflammatory agents, and (v) at least one of a partial pressure of arterial oxygen to fraction of inspired oxygen ($PO_2$:$FIO_2$) ratio less than 300 mm Hg, pulmonary edema, injury, or inflammation, wherein the ex vivo lung is from a human donor, and wherein the exogenous stem cells are from a source other than the donor and a source other than the recipient, wherein expression of IL-10 in the cells of the ex vivo lung is at a level that is greater than a level of expression of IL-10 in a corresponding ex vivo lung that does not comprise the exogenous transgene, and wherein the cells of the ex vivo lung express IL-1β, IL-8 and/or IL-6 at a level of expression that is less than the level of expression in a corresponding ex vivo lung that does not comprise the exogenous transgene and the exogenous stem cells.

10. The ex vivo lung of claim 9, wherein the lung is an uncontrolled Maastricht category IV lung.

* * * * *